United States Patent Office 3,214,336
Patented Oct. 26, 1965

3,214,336
CARBAMIC ACID ESTER COMPOSITIONS AND
METHODS OF USING SAME
Howard E. Parker, Dayton, Ohio, assignor, by mesne assignments, to The Upjohn Company, Kalamazoo, Mich., a corporation of Delaware
No Drawing. Filed Aug. 26, 1960, Ser. No. 52,052
5 Claims. (Cl. 167—55)

The present invention relates to a therapeutic composition and is more particularly concerned with a therapeutic composition having both muscle relaxant and tranquilizing properties, and containing as its essential active ingredient a novel 3-p-halophenoxy-2-hydroxy-propyl carbamate, particularly 3-p-chlorophenoxy-2-hydroxy-propyl carbamate. The invention further relates to methods of making and using such a composition.

Heretofore, certain substituted propanediols or glyceryl ethers have been demonstrated to possess skeletal muscle relaxant qualities. These include, for example, 3-o-toloxy-1,2-propanediol (mephenesin), 3-o-methoxyphenoxy-1,2-propanediol (glyceryl guaiacolate), 3-o-toloxy-2-hydroxypropyl carbamate (U.S. Patent 2,609,386), and 3-o-methoxyphenoxy-2-hydroxy-propyl carbamate (methocarbamol). Likewise, certain other substituted diols have been reported to exhibit pronounced tranquilizing properties. This latter group includes such compounds as 2-methyl-2-propyl-1,3-propanediol dicarbamate (meprobamate—U.S. Patent 2,724,720) and 2-p-chlorophenyl-3-methyl-2,3-butanediol (phenaglycodol).

It is an object of the present invention to provide non-toxic therapeutic compositions suitable for relieving skeletal muscle tension and spasms, and for producing tranquility.

A further object is to provide a method of inducing muscle relaxation in mammals and other animals and humans subject to excessive skeletal muscle and other tensions which comprises administering a therapeutically effective amount of a 3-p-halophenoxy-2-hydroxy propyl carbamate in a suitable dosage unit form.

It has been found that significant levels of both muscle relaxant and tranquilizing properties are present in compounds having the following structural formula:

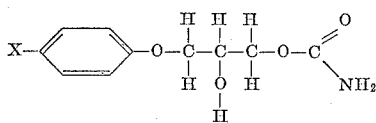

wherein X is a halogen atom.

The novel compositions of this invention are therapeutic compositions, characterized by muscle relaxant and tranquilizing activities, comprising as an essential active ingredient a 3-p-halophenoxy-2-hydroxypropyl carbamate and a non-toxic pharmaceutical carrier. Preferably, the essential active ingredient is 3-p-chlorophenoxy-2-hydroxy-propyl carbamate.

The novel organic compounds are the 3-p-halophenoxy-2-hydroxypropyl carbamates. These include the 3-p-bromo-, 3-p-iodo-, 3-p-fluoro-, and 3-p-chlorophenoxy-2-hydroxy-propyl carbamates, the 3-p-chlorophenoxy-2-hydroxy-propyl carbamate being a preferred species embodiment.

These compounds have utility as muscle relaxants and tranquilizers.

In preparing these substituted propanediols, known starting materials are employed. Such 3-p-halophenoxy-1,2-propanediols as the 3-p-bromophenoxy-1,2-propanediol and 3-p-chlorophenoxy-1,2-propanediol are readily available as starting compounds. Other 3-p-halophenoxy-1,2-propanediols are conveniently prepared by reacting the appropriate p-halophenol, usually as the sodium or potassium salt, with a glyceryl monohalohydrin, preferably in non-aqueous media. Any salt formed is conveniently removed by filtration, the solvent removed by distillation, and the desired 3-p-halophenoxy-1,2-propanediol purified by fractionation at low pressure. The product may be further purified by recrystallization from water and common organic solvents, e.g., carbon tetrachloride or toluene.

In general, the starting 3-p-halophenoxy-1,2-propanediols are first reacted with approximately equimolar quantities of phosgene in the presence of an organic solvent, such as benzene, toluene or the like. The phosgene in organic solvent is added slowly to the selected 3-p-halophenoxy-1,2-propanediol, the reaction being maintained at about room temperature, e.g., about 30 degrees centigrade. When all solid material is dissolved, an equimolar portion of an organic amine base, such as pyridine, dimethyl aniline, triethylamine or the like, is added slowly to the reaction mixture. The reaction is completed in about one-half to one hour's time, an intermediate chloro-carbonate compound being formed. Such intermediate chloro-carbonate compound may be isolated, if desired. However, it is generally satisfactory to merely draw off the organic solvent layer, e.g. benzene, containing the intermediate compound and to react it with ammonia or ammonium hydroxide, the resulting reaction being maintained at reduced temperature, e.g., 5–10 degrees centigrade, for a period of several hours, e.g., 5–6 hours. The reaction product, the crude 3-p-halophenoxy-2-hydroxy-propyl carbamate, is obtained as a solid and is then recovered and recrystallized from mixed organic solvents as a white crystalline powder.

The therapeutic compositions, containing the 3-p-chlorophenoxy-2-hydroxy-propyl carbamate, for example, as a principal active component, are prepared in a wide variety of forms, such as compressed or coated tablets, soft and hard gelatin capsules, suspensions and other liquid preparations. These therapeutic compositions are easily prepared in dosage units. For example, 10 milligrams of 3-p-chlorophenoxy-2-hydroxy-propyl carbamate blended with a carrier composed of lactose, corn starch, stearic acid, and talc in a compressed tablet provides a very satisfactory dosage unit form. In general between 10 and as much as 500 or more milligrams of the active substituted propanediol may be employed per dosage unit.

Where desired, excipients, binders, extenders, adjuvants, flavoring materials and the like are incorporated.

The preferred pharmaceutical carriers or diluents are non-toxic solids, such as starch, dextrose, lactose, acacia, talc, stearic acid, magnesium stearate, colloidal clays, tragacanth, and the like.

Where therapeutic compositions are prepared in such dosage unit forms as elixirs, suspensions and as liquid preparations for subcutaneous use, non-toxic, liquid carriers or diluents are utilized. Such carriers include water, alcohol, glycerine, sorbitols and the like.

The following examples illustrate the preparation of the compounds and compositions of the present invention but are not to be construed as limiting.

*Example 1.—3-p-chlorophenoxy-2-hydroxy-propyl carbamate*

1.0 mole of 3-p-chlorophenoxy-1,2-propanediol (chlorphenesin) was suspended in 1000 ml. of benzene in a five liter flask equipped with a dropping funnel, thermometer and stirrer. 1.0 mole of phosgene in 500 ml. of cold, dry benzene was then added dropwise over a period of 45 minutes, the resulting mixture being maintained at 30 degrees centigrade until all solid material was dissolved. This was completed in three hours. Thereafter, 1.0 mole of triethylamine was added dropwise and the resulting reaction mixture stirred for 45 minutes at 30 degrees centigrade following the addition. The reaction mixture was then cooled to 5 degrees centigrade and extracted repeatedly with 600 ml. portions of cold water to remove the triethylamine hydrochloride. The benzene fraction, containing the intermediate 3-p-chlorophenoxy-2-hydroxypropyl chlorocarbonate, was added to 600 ml. of cold concentrated ammonium hydroxide and the resulting reaction mixture agitated vigorously at 5 degrees centigrade for seven hours. The crude 3-p-chlorophenoxy-2-hydroxy-propyl carbamate solid was then filtered off, dissolved in hot benzene, dried to remove all traces of water, and permitted to crystallize out. Several recrystallizations from solvent mixtures of benzene and toluene, with small amounts of acetone, produced a nicely crystalline white solid in about 65 percent yield. The product was identified as 3-p-chlorophenoxy-2-hydroxy-propyl carbamate, melting at 89–91 degrees centigrade. The infrared spectrum of this compound in chloroform solution showed a strong band at 1730 cm.$^{-1}$.

*Example 2.—Therapeutic composition*

A composition utilizing the 3-p-chlorophenoxy-2-hydroxy-propyl carbamate of Example 1 and having the following components was prepared:

| | Parts by weight |
|---|---|
| 3-p-chlorophenoxy-2-hydroxy-propyl carbamate | 1.3 |
| Lactose | 38.0 |
| Corn starch | 4.9 |
| Water (distilled) | 6.0 |
| Stearic acid | 0.5 |
| Talc | 2.1 |

A starch paste was prepared from 1.0 part of corn starch and 6.0 parts of water. This paste was admixed with the 3-p-chlorophenoxy-2-hydroxy-propyl carbamate, previously blended with the lactose. The resulting admixture was screened (4 mesh) and dried overnight at 50 degrees centigrade. The dried admixture was granulated and passed through a 16 mesh screen. This fraction was then blended with the finely particulated stearic acid, talc and corn starch (3.9 parts) and the resulting composition compressed into tablets each containing 10 mg. of 3-p-chlorophenoxy-2-hydroxy-propyl carbamate. The composition was found to possess activity as a muscle relaxant and tranquilizer.

The 3-p-halophenoxy-2-hydroxy-propyl carbamates and the therapeutic compositions of this invention have proved useful as tranquilizers and skeletal muscle relaxants in animal and clinical studies.

For example, therapeutic compositions containing as their essential active component the 3-p-chlorophenoxy-2-hydroxy-propyl carbamate were subjected to animals studies with albino rats in comparison with both mephenesin carbamate and methocarbamol. Albino rats (Sprague-Dawley strain of both sexes) weighing 160–250 grams were fed orally measured single doses of a 10 percent suspension of the test compound in methyl cellulose by means of a rubber catheter attached to a hypodermic syringe. The animals were then fed and closely observed during a three hour period for signs of muscular relaxation. The degree of relaxation was designated in terms of percent: 100 percent no reflexes; 99 percent pain reflex; 95 percent pain, touch and sound reflexes; 90 percent extremely uncoordinated crawling movements when disturbed; 75 percent uncoordinated movements when disturbed; 50 percent extreme relaxation—able to walk but with great difficulty; 25 percent marked relaxation.

All three preparations produced a state of relaxation in all of the animals treated. The 3-p-chlorophenoxy-2-hydroxy-propyl carbamate produced 100 percent relaxation in 60 percent of the animals when given in a dose of 2.00 gm./kg. of body weight. All animals at this dosage survived the test. Mephenesin carbamate produced 100 percent relaxation in 100 percent of the animals given in a dose of 2.00 gm./kg. of body weight. 70 percent of the animals at this dosage survived the test. Methocarbamol produced 100 percent relaxation in 70 percent of the animals when given in a dose of 2.00 gm./kg. of body weight. 90 percent of the animals at this dosage survived the test.

Further animal studies were made in comparison with meprobamate and phenaglycodol in evaluating the muscle relaxant activity of compositions containing the 3-p-chlorophenoxy-2-hydroxy-propyl carbamate. Swiss 51 albino mice (of both sexes) weighing 20–25 grams were fed orally measured single doses of the test compounds suspended in methyl cellulose. A feeding needle attached to a hypodermic syringe was employed in the procedure. In the final series of tests, the animals were fed specific doses and the degree of activity was recorded by means of a kymograph attached to the jiggle cage.

All three preparations produced a state of tranquility in all of the animals treated. The minimal oral dose of 3-p-chlorophenoxy-2-hydroxy-propyl carbamate required to produce tranquilizing effect was found to be 5 mg./kg. of body weight. The minimal oral dose of meprobamate required to produce tranquilizing effect was found to be 5.75 mg./kg. of body weight. The minimal oral dose of phenaglycodol required to produce tranquilizing effect was found to be 4.25 mg./kg. of body weight. Tranquilization was produced in the test animals within three to eight minutes after feeding with each of the three preparations.

Thus, these data show that the 3-p-halophenoxy-2-hydroxy-propyl carbamates are comparable in potency to meprobamate and phenaglycodol both as muscle relaxants and tranquilizers This is surprising in view of the substantial structural differences between the compounds of this invention and the prior art compounds.

It is to be understood that the invention is not to be limited to the exact compounds and compositions shown and described, as obvious modifications and equivalents will be apparent to one skilled in the art, and the invention is therefore to be limited only by the scope of the appended claims.

I claim:
1. A therapeutic composition, characterized by muscle relaxant and tranquilizing properties, comprising from about 10 to about 500 milligrams of 3-p-chlorophenoxy-2-hydroxy-propyl carbamate and a nontoxic pharmaceutical carrier in dosage unit form.
2. The composition of claim 1 wherein the pharmaceutical carrier is a solid.
3. The method of inducing muscle relaxation and tranquility in a living host which comprises administering orally to said living host a therapeutically effective amount of 3-p-halophenoxy-2-hydroxy-propyl carbamate.
4. The method of claim 3 wherein said 3-p-halophenoxy-2-hydroxy-propyl carbamate is 3-p-chlorophenoxy-2-hydroxy-propyl carbamate.
5. The method of inducing muscle relaxation in a hu- man subject which comprises administering orally to said human subject a therapeutically effective amount of 3-p-halophenoxy-2-hydroxy-propyl carbamate.

References Cited by the Examiner

UNITED STATES PATENTS

| | | | |
|---|---|---|---|
| 2,197,479 | 4/40 | Meigs | 260—482 |
| 2,770,649 | 11/56 | Murphey | 167—65 |
| 2,771,485 | 11/56 | Weihe | 260—482 |
| 2,813,104 | 11/57 | McDowell | 260—340.2 |
| 2,854,379 | 9/58 | Fancher | 167—65 |
| 2,872,374 | 2/59 | Beiler | 167—65 |

OTHER REFERENCES

Beasley, J. Pharm. Pharmacol., vol. 9, p. 13, 1957.
Berger, Annals of N.Y. Acad. Ac., vol. 66, pp. 685–700, 1957
Bradley, Nature, vol. 159, No. 4050, June 14, 1947, pp. 813–814.
Goldstein, J. of Am. Pharm. Assoc., vol. 18, No. 2, Prac. Pharm. Ed., pp. 92–95, February 1957.
Miltown, Wallace Laboratories Booklet, rec'd 1956, p. 10.

FRANK CACCIAPAGLIA, JR., *Primary Examiner.*

MORRIS O. WOLK, LEWIS GOTTS, JULIAN S. LEVITT, *Examiners.*